(12) United States Patent
Cassett et al.

(10) Patent No.: US 7,200,908 B2
(45) Date of Patent: Apr. 10, 2007

(54) METHOD OF MAKING A VARIABLE CAPACITOR COMPONENT

(75) Inventors: Fabrice Cassett, Tencin (FR); Guillaume Bouche, Grenoble (FR); Maurice Rivoire, Meylan (FR)

(73) Assignees: STMicroelectronics S.A., Montrouge (FR); Commissariat a l'Energie Atomique, Paris Cedex (FR)

( * ) Notice: Subject to any disclaimer, the term of this patent is extended or adjusted under 35 U.S.C. 154(b) by 0 days.

(21) Appl. No.: 11/442,420

(22) Filed: May 26, 2006

(65) Prior Publication Data
US 2006/0213044 A1 Sep. 28, 2006

Related U.S. Application Data

(62) Division of application No. 10/999,211, filed on Nov. 29, 2004, now Pat. No. 7,082,024.

(51) Int. Cl.
*H01G 7/00* (2006.01)
*H01G 5/00* (2006.01)

(52) U.S. Cl. ............... 29/25.42; 29/25.41; 29/592.1; 29/592; 29/622; 361/278; 361/298.1; 216/56; 438/379

(58) Field of Classification Search .......... 29/825–832, 29/25.25, 25.41–25.42, 592–594; 361/277–278, 361/280–283, 291, 287; 73/118, 1.38, 1.88; 438/53, 330, 381, 948; 333/133, 189; 310/322, 310/324
See application file for complete search history.

(56) References Cited

U.S. PATENT DOCUMENTS

| 3,993,939 | A | | 11/1976 | Slavin et al. | |
|---|---|---|---|---|---|
| 4,369,483 | A | | 1/1983 | Shirakawa | |
| 4,675,960 | A | * | 6/1987 | Higgins, Jr. | ............... 29/25.35 |
| 4,944,187 | A | | 7/1990 | Frick et al. | |
| 5,559,665 | A | | 9/1996 | Taranowski et al. | |
| 5,884,378 | A | | 3/1999 | Dydyk | |
| 6,046,659 | A | | 4/2000 | Loo et al. | |
| 6,738,484 | B2 | | 5/2004 | Nakabayashi | |
| 6,912,759 | B2 | * | 7/2005 | Izadnegahdar et al. | .... 29/25.35 |
| 7,053,730 | B2 | * | 5/2006 | Park et al. | ................... 333/133 |
| 7,082,024 | B2 | * | 7/2006 | Casset et al. | ............... 361/277 |

FOREIGN PATENT DOCUMENTS

DE 43 02 204 9/1993

OTHER PUBLICATIONS

French Search Report from a corresponding French Application 03/50911, filed Nov. 23, 2003.

(Continued)

*Primary Examiner*—Minh Trinh
(74) *Attorney, Agent, or Firm*—Lisa K. Jorgenson; James H. Morris; Wolf, Greenfield & Sacks, P.C.

(57) ABSTRACT

A method of making a variable capacitor by forming a grove portion in an insulating substrate, two upper portions of the substrate located on either side of the groove portion forming two lateral edges, a conductive layer covering the inside of the groove portion, a flexible conductive membrane, placed above the groove portion by bearing on the edges, a dielectric layer covering the conductive layer or the membrane to insulate the conductive layer and the membrane, and terminals of application of a voltage between the conductive layer and the membrane, and such that the depth of the groove portion continuously increases from one of the edges to the bottom of the groove portion, and that the conductive layer covers the inside of the groove portion at least to reach one of the two edges, that it may cover.

4 Claims, 8 Drawing Sheets

OTHER PUBLICATIONS

Patent Abstracts of Japan, vol. 1998, No. 11, Sep. 30, 1998 & JP 10 154456, Omron Corp, Jun. 9, 1998.

Patent Abstracts of Japan, vol. 1998, No. 12, Dec. 26, 1996 & JP 08 213282, Murata Mfg. Co. Ltd, Aug. 20, 1996.

* cited by examiner

METHOD OF MAKING A VARIABLE CAPACITOR COMPONENT

RELATED APPLICATIONS

This application is a division of prior application No.: 10/999,211, filed on Nov. 29, 2004, which is U.S. Pat. No. 7,082,024.

BACKGROUND OF THE INVENTION

1. Field of the Invention

The present invention relates to a variable capacitor, the capacitance of which can be set by application thereacross of a voltage capable of deforming one of its electrodes.

2. Discussion of the Related Art

FIGS. 1A and 1B are cross-section views of an example of a known variable capacitor in two operating states. This variable capacitor is described in a document of Epoch Technologies under the title "A Zipper-Action Differential Micro-Mechanical Tunable Capacitor". A lower electrode 1 covered with a dielectric layer 2 is laid on an insulating substrate 3. A pad 4 is laid on the substrate next to conductive layer 1. An upper electrode 5 bearing on one side on pad 4 is placed to overhang dielectric layer 2. Electrodes 1 and 5 of the capacitor are connected to a control circuit that applies a voltage between the electrodes.

At rest, when no voltage is applied between the electrodes, upper electrode 5 is substantially horizontal and parallel to the lower electrode, as illustrated in FIG. 1A. In the activation state, when a voltage is applied between the electrodes, upper electrode 5 deforms on the side non-attached to pad 4, to come in contact with dielectric layer 2, as illustrated in FIG. 1B. Once the upper electrode is in contact, the portion of the upper electrode located close to the contact point is close to the lower electrode and it is possible to bring it to a contact with a low voltage. The upper electrode thus deforms until the mechanical pull-back force becomes equal to the electrostatic force exerted between electrodes.

A disadvantage of such a variable capacitor structure is that it is necessary to apply a strong initial voltage to deform the upper electrode until it contacts dielectric layer 2.

The abstract of a Japanese patent 08/213282 (Patent abstracts of Japan, vol. 1996, N° 12) describes a variable capacitor structure comprising a plane electrode lying on the bottom of a cavity and a movable electrode which is placed above the cavity and bears against the edges of the cavity. The application of a voltage between the electrodes leads to the deformation of the above electrode and consequently to an increase of the capacitance of the capacitor. A disadvantage of this structure is that it is necessary to apply a strong voltage to deform the upper electrode.

Moreover, German patent application DE 43 02 204, and the abstract of Japanese patent 10/154456 (Patent abstracts of Japan, vol. 1998, N° 11) describe switch structures comprising a lower electrode on a slant face of a substrate and a upper electrode formed of a beam overhanging over the substrate from the top of the slant face. Two conductive pads are placed at the extremity of the beam and on the substrate at the bottom of the slant face. The application of a voltage between both electrodes deforms the upper electrode by coming closer to the lower electrode until contacting both pads. These switches work in a "binary" way. The electrodes are either apart either in contact and consequently, these both electrodes do not constitute a capacitor whose capacitance can be adjusted.

SUMMARY OF THE INVENTION

An object of the present invention is to provide a variable capacitor comprising a mobile electrode deformable with a low voltage applied between the capacitor electrodes.

Another object of the present invention is to provide such a variable capacitor whose capacitance can be easily adjusted.

Another object of the present invention is to provide components comprising such a variable capacitor.

To achieve these and other objects, the present invention provides a variable capacitor comprising: a groove portion formed in an insulating substrate, two upper portions of the substrate located on either side of the groove portion forming two lateral edges, a conductive layer covering the inside of the groove portion, a flexible membrane, formed of a conductive material, placed above the groove portion by bearing on said edges, a dielectric layer covering the conductive layer or the membrane to insulate the portions of the conductive layer and of the membrane which are close to each other, and terminals of application of a voltage between the conductive layer and the membrane, and such that the depth of the groove portion continuously increases from one of the edges to the bottom of the groove portion, and that the conductive layer covers the inside of the groove portion at least to reach one of the two edges, that it may cover.

According to an embodiment of the above-mentioned capacitor, said groove portion is a portion of a cavity formed in the insulating substrate.

According to an embodiment of the above-mentioned capacitor, the conductive layer covers the inside of the groove portion and reaches the two edges.

According to an embodiment of the above-mentioned capacitor, a trench is formed in the substrate, spacers being placed against two opposite walls of the trench, the trench space not taken up by the spacers forming said groove portion.

According to an embodiment of the above-mentioned capacitor, a trench is formed in the substrate, a spacer being placed against one of the trench walls, the trench space not taken up by the spacers forming said groove portion, said conductive layer covering said spacer and a large portion of the bottom of the groove portion located close to the spacer, the bottom portion of the groove portion located close to the wall with no spacer being exposed.

According to an embodiment of the above-mentioned capacitor, the membrane is in an idle state when no voltage is applied between said terminals, the application of a voltage deforming the membrane by drawing it closer to the conductive layer, the removal of the voltage bringing the membrane back to its idle state.

According to an embodiment of the above-mentioned capacitor, said groove portion comprises several portions exhibiting different inclinations.

The present invention also provides a resonator comprising a capacitor such as described hereabove, and further comprising a piezoelectric layer resting on the flexible membrane, and a second conductive layer resting on the piezoelectric layer, said conductive layer and the second conductive layer forming the resonator electrodes.

The present invention also provides a switch comprising a capacitor such as described hereinabove, and wherein said conductive layer comprises two separate portions, each portion covering one of the sides of the groove portion, reaching one of its edges, said membrane comprises two separate portions substantially placed above the two portions of said conductive layer, and said dielectric layer covers the lower surface of the flexible membrane, and further comprising at least one pair of first conductive pads placed at the bottom of the groove portion between the two portions of the conductive layer and at least one second conductive pad inserted in the dielectric layer on its lower surface side, above the pairs of first conductive pads, the second conductive pads being likely to put in contact the first two pads of each pair after deformation of the membrane by application of a voltage between the conductive layer and the membrane.

The present invention also provides a method for forming a variable capacitor comprising the steps of: forming a cavity in an insulating substrate, a cavity portion substantially having the shape of a groove portion, the upper parts of the substrate located close to said groove portion forming two lateral edges; covering the inside of the groove portion, at least to reach one of the edges and possibly covering one or two edges with a first conductive layer; filling the cavity with a sacrificial portion; covering the sacrificial portion, the upper substrate portions and possibly the portions of the first conductive layer placed above the lateral edges with an insulating layer and with a second conductive layer; etching the insulating layer and the second conductive layer to keep a bridge-shaped portion running over the groove portion and bearing against the lateral edges; and removing the sacrificial portion.

According to an embodiment of the above-described method, the step of forming a cavity in an insulating substrate comprises the steps of: forming insulating pads on a support layer; covering the support layer and the insulating pads with an insulating layer; and performing a chem./mech polishing of the insulating layer to expose the insulating pads, the etch method of the polishing being such that it etches more the insulating layer than the insulating pads, the insulating pads forming said lateral edges.

According to an embodiment of the above-described method, the method further comprises, prior to the cavity filling with a sacrificial portion, a step of forming insulating portions on the cavity edge, the cavity filling then comprising depositing a sacrificial layer over the entire structure and then performing a chem./mech polishing to expose the insulating portions.

According to an embodiment of the above-described method, the step of forming a cavity in a substrate comprises the steps of: providing, on an insulating substrate, a stacking of different insulating layers, an opening being formed in each of the layers, the openings being superposed and larger and larger as they are further away from the substrate, each opening being placed to completely expose the underlying opening; and performing a chem./mech polishing of the previously-obtained structure by using an etch method such that the etch speeds of the different insulating layers are different and increase from the substrate to the top of the stacking.

The foregoing and other objects, features, and advantages of the present invention will be discussed in detail in the following non-limiting description of specific embodiments in connection with the accompanying drawings.

DETAILED DESCRIPTION

As usual in the representation of integrated circuits, the various drawings are not drawn to scale.

In a first part, an example of a structure and of a method for forming a capacitor according to the present invention will be described.

In a second part, two other examples of capacitors according to the present invention that can be obtained according to a substantially identical method will be described.

In a third part, a structure and a method for manufacturing a capacitor comprising an electrode exhibiting multiple inclinations will be described.

In a fourth part, a structure and a method for forming a resonator comprising a capacitor according to the present invention will be described.

In a fifth part, a structure and a method for forming a microswitch comprising a capacitor according to the present invention will be described.

1. Example of a Capacitor According to the Present Invention 1.1. Structure

Figure 1A:
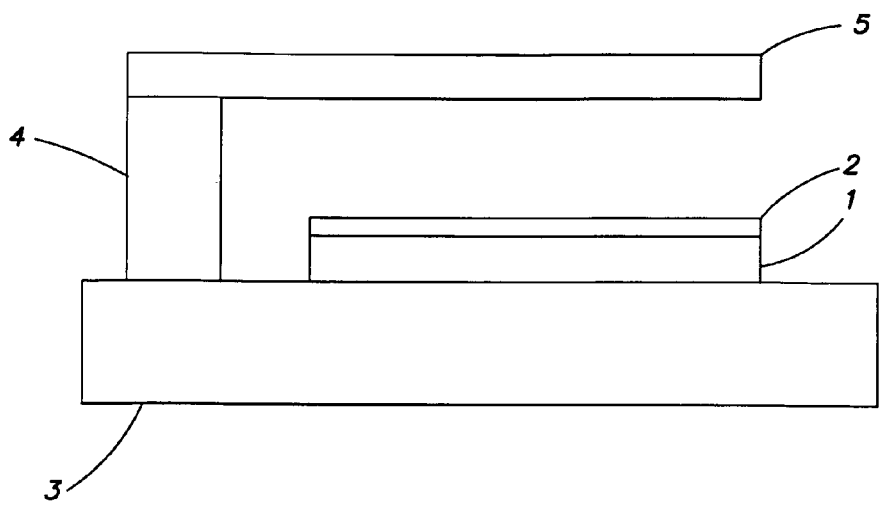
FIGS. 1A and 1B are cross-section views of a known variable capacitor, previously described, in two operation steps.
Figure 1B:
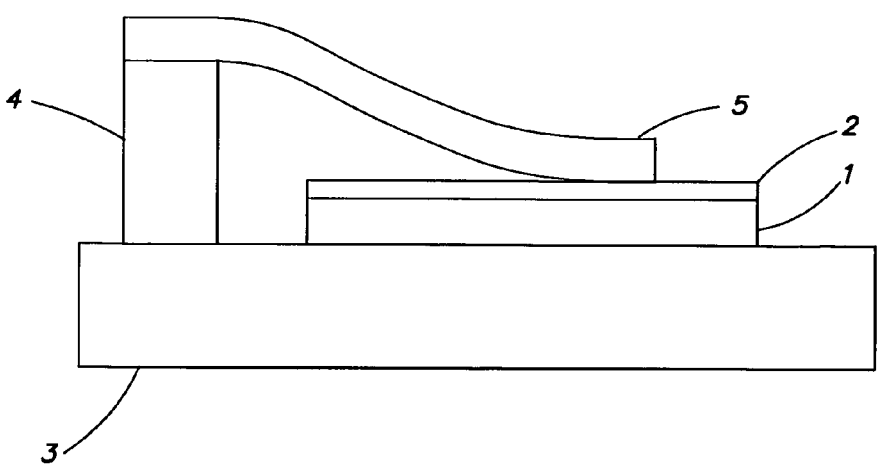
Figure 2A:
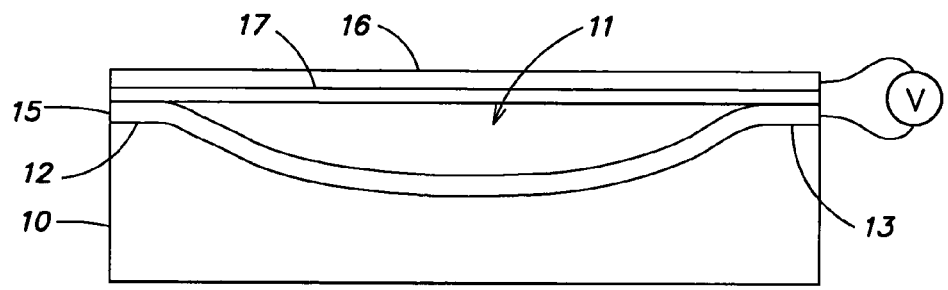
FIGS. 2A and 2B are cross-section views of an example of a variable capacitor according to the present invention in two operation states.
Figure 2B:
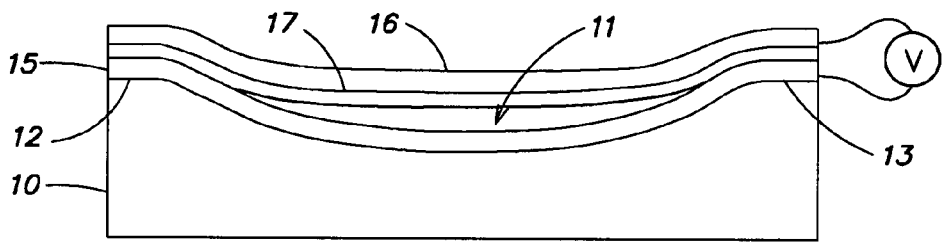
Figure 3:
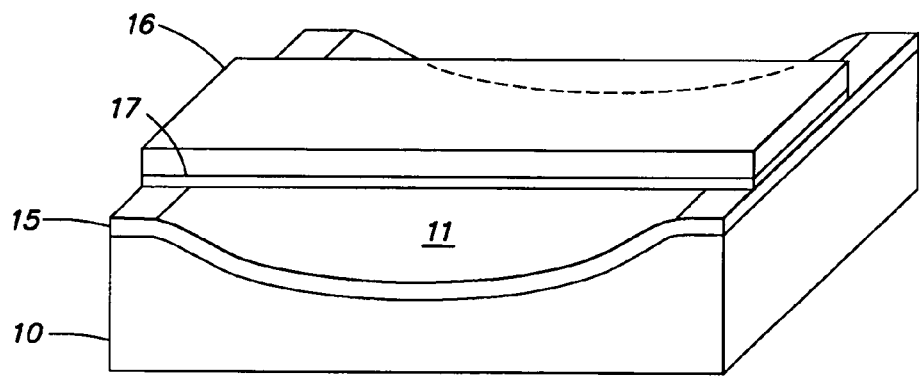
FIG. 3 is a perspective view of the capacitor shown in FIG. 2A.

FIGS. 2A and 2B are cross-section views of a capacitor according to the present invention in two different operation states. FIG. 3 is a perspective view of the capacitor shown in FIG. 2A. The capacitor is formed in an insulating substrate 10, and more specifically in and above a groove portion 11 formed in insulating substrate 10. The two upper portions of the substrate located on either side of groove portion 11 form two lateral edges 12 and 13. A conductive layer 15 covers the inside of groove portion 11 up to the two edges 12 and 13, that is also covers in this example. A membrane 16, formed of a conductive material, is placed above groove portion 11 and bears against edges 12 and 13. An insulating layer 17 covers the lower surface of membrane 16. Insulating layer 17 insulates the portions of conductive layer 15 and of membrane 16 which are close to each other, especially above edges 12 and 13. As visible in FIG. 3, membrane 16 covered with insulating layer 17 substantially has the shape of a beam bearing on the two edges 12 and 13 of groove portion 11. Conductive layer 15 and membrane 16 are connected to two terminals between which a control circuit V applies a voltage on request.

A capacitor according to the present invention may be used as a discrete component or belong to an integrated circuit. In the case of a discrete component, conductive layer 15 and membrane 16 are connected to external connection pads. In an integrated circuit generally comprising a semiconductor substrate in which are formed active components such as transistors and an interconnect network comprising several metallization levels on which are formed conductive lines connected by conductive vias, a capacitor according to the present invention may be placed above the interconnect network, on one of the metallization levels, or possibly in a cavity of the semiconductor substrate by providing to place an insulating layer between the semiconductor substrate and the capacitor. Further, to protect and/or insulate the capacitor from other elements of the circuit or of the package in which the circuit is inserted, a protection "bell", for example formed of a semi-spherical insulating portion, may be placed above the capacitor.

In the idle state, when control circuit V applies no voltage, membrane 16 and insulating layer 17 are substantially horizontal, as shown in FIGS. 2A and 3. The capacitor capacitance then is minimum. When control circuit V applies a voltage, membrane 16 progressively deforms by coming closer to conductive layer 15, as shown in FIG. 2B. The amplitude of the deformation is all the greater as the voltage applied by control circuit V is high. Thus, to a given voltage value corresponds a capacitance, the capacitance being all the greater as the voltage is high.

According to an aspect of the present invention, the depth of groove portion 11 continuously increases from edges 12 and 13 of the groove to the groove bottom. This structural characteristic enables for a deformation of membrane 16 to occur with a low voltage. Indeed, the portions of layer 15 and of membrane 16 located close to edges 12 and 13 of groove portion 11 are close to each other and a low voltage therebetween enables bringing them closer to each other. Once these first portions have been brought closer together, the portions of conductive layer 15 and of membrane 16 located right next to them are then close to each other and a small voltage enables bringing them closer together, and so on. Membrane 16 deforms until the "mechanical" pull-back force of the membrane becomes equal to the electrostatic force created between layer 15 and membrane 16, the electrostatic force being substantially proportional to the voltage applied by control circuit V.

An advantage of a capacitor according to the present invention is that it is possible to adjust its capactitance with a very low voltage.

1.2. Capacitor Forming Method

A capacitor according to the present invention may be formed according to the method described hereafter.

Figure 4A:
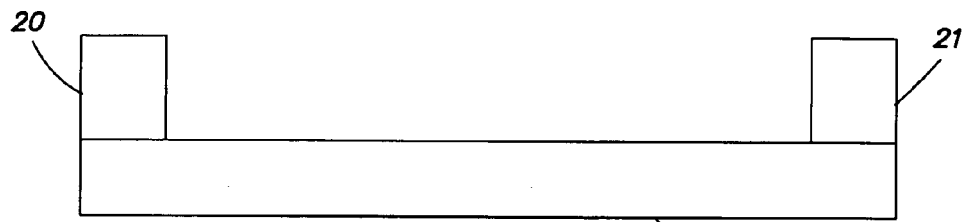
FIGS. 4A to 4H are cross-section views of structures obtained after successive steps of a method for forming a variable capacitor according to the present invention.

In an initial step, illustrated in FIG. 4A, insulating pads 20 and 21 are formed on a support layer 22. Insulating pads 20 and 21 are in contact with other insulating pads not shown to surround an exposed portion of the upper surface of support layer 22. Support layer 22 may be the semiconductor substrate of the integrated circuit or one of the layers of the integrated circuit interconnect network. Insulating pads 20 and 21 are, for example, made of nitride.

Figure 4B:
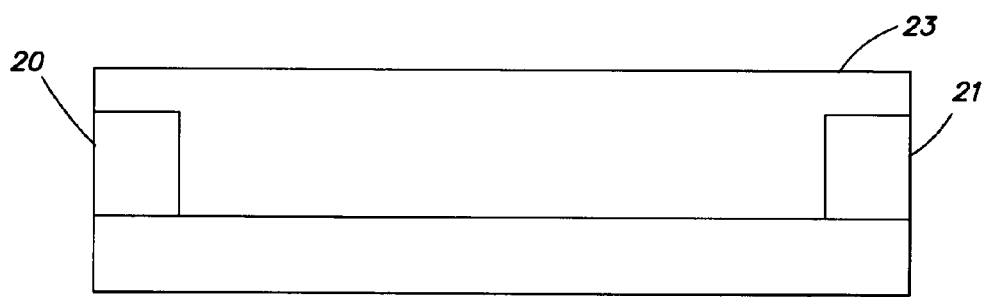

At the next step, illustrated in FIG. 4B, support layer 22 and insulating pads 20 and 21 are covered with an insulating layer 23. Insulating layer 23 for example is made of silicon oxide $SiO_2$.

Figure 4C:
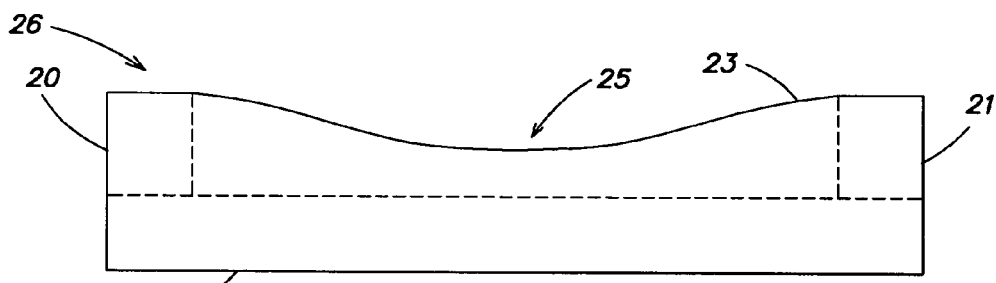

At the next step, illustrated in FIG. 4C, a chem./mech polishing of insulating layer 23 is performed to expose insulating pads 20 and 21. The etch method implemented in the polishing is selected to be such that is "etches" more $SiO_2$ insulating layer 23 than nitride pads 20 and 21. When pads 20 and 21 are relatively spaced apart, a hollow forms in insulating layer 23 between pads 20 and 21. The phenomenon, known as "dishing", is generally not desirable since it leads to the forming of non-planar surfaces. However, advantage is taken of this phenomenon in the method of the present invention for the forming of a groove portion 25 between pads 20 and 21 forming two lateral edges of groove portion 25. Groove portion 25 is in fact a portion of the cavity formed in insulating layer 23 in the chem./mech polishing.

The method described in relation with FIGS. 4A to 4C is an example of a method enabling forming a groove portion 25 in an insulating substrate. In the above-described method example, insulating pads 20, 21 and insulating layer 23 form an insulating substrate 26. Other methods for forming a groove portion 25 in a substrate 26 may be used.

Figure 4D:
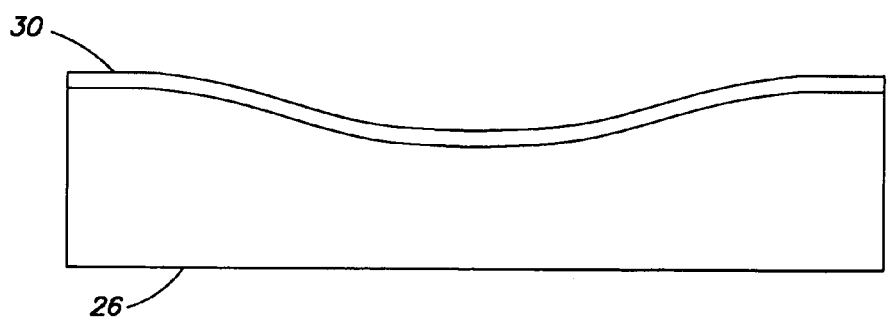

At the next step, illustrated in FIG. 4D, the inside of groove portion 25 is covered with a conductive layer 30 extending to the edges of groove portion 25 and possibly above the groove edges.

Figure 4E:
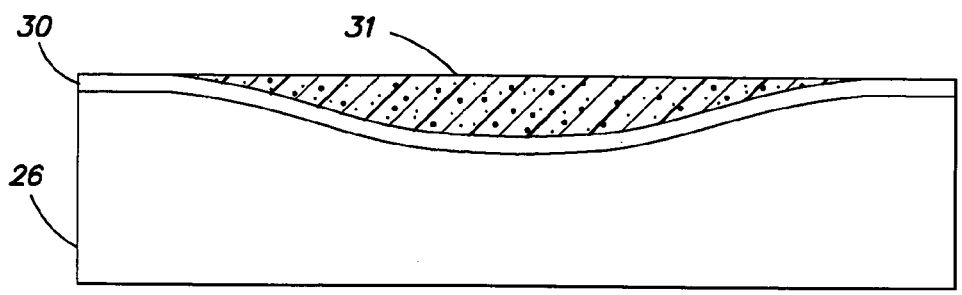

At the next step, illustrated in FIG. 4E, groove portion 25 is filled with a sacrificial portion 31. Sacrificial portion 31 does not cover the edges of groove portion 25. Sacrificial portion 31 is for example formed of a resin. Sacrificial portion 31 may be formed by depositing a sacrificial layer on the previously-obtained structure and by then performing a chem./mech polishing of this sacrificial layer to expose conductive layer 30.

According to an alternative of the above-mentioned step, a thin insulating layer, for example made of silicon oxide, is deposited on the structure such as shown in FIG. 4D. This thin insulating layer is then etched to expose the portion of the conductive layer located in the groove portion, by keeping insulating layer portions on the edges of groove portion 25. A sacrificial layer is then deposited over the entire structure and a chem./mech polishing is performed to expose insulating layer portions placed on the edges of groove portion 25. This alternative manufacturing enables more precisely delimiting the sacrificial layer portion, which would eventually enable more specifically defining the geometric features of the capacitor.

Figure 4F:
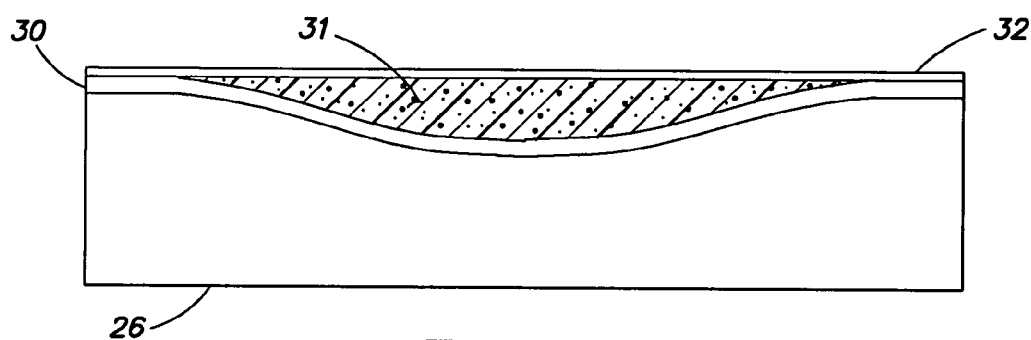

At the next step, illustrated in FIG. 4F, an insulating layer 32 which covers sacrificial portion 31 and the portions of conductive layer 30 located on the edges of groove portion 25 is formed. Insulating layer 32 is for example a nitride layer SiN.

Figure 4G:
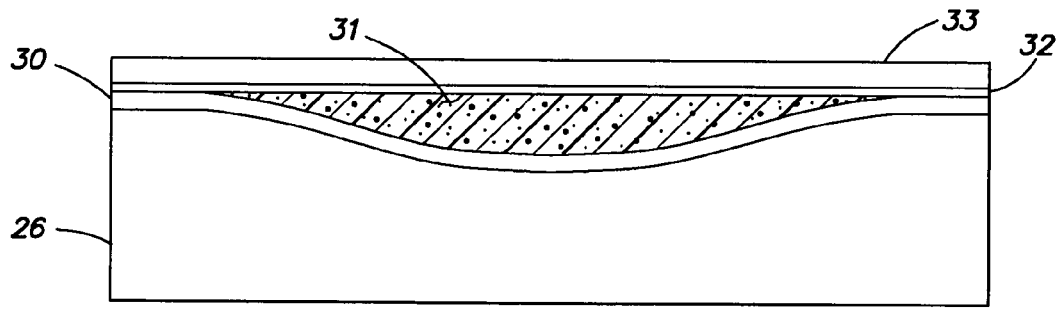

At the next step, illustrated in FIG. 4G, insulating layer 32 is covered with a conductive layer 33. Conductive layers 30 and 33 may be formed of identical or different materials such as aluminum, copper, or gold.

Figure 4H:
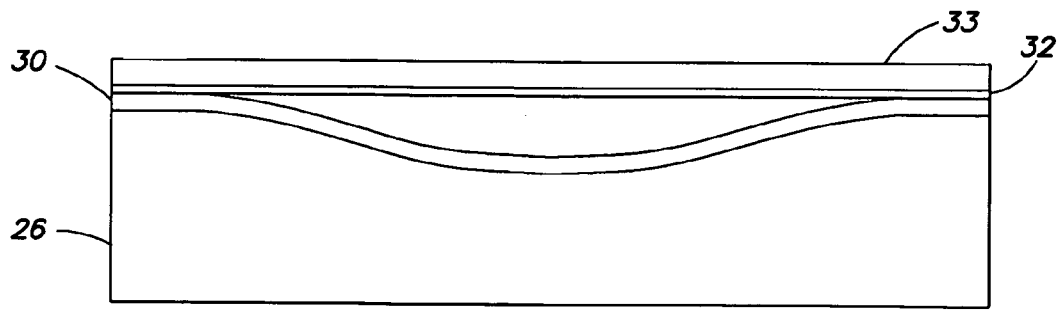

At the next step, illustrated in FIG. 4H, conductive layer 33 and insulating layer 32 are etched to form a beam placed above groove portion 25. Sacrificial portion 31 is then eliminated.

Figure 5A:
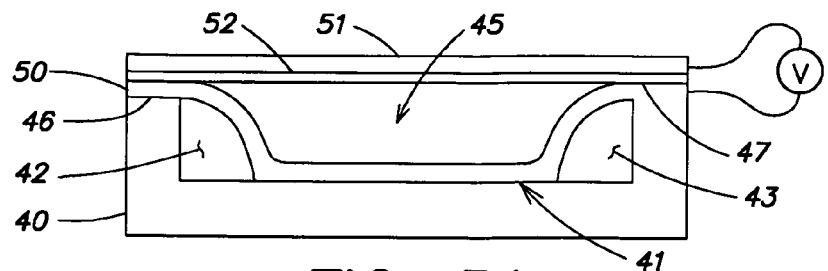
FIGS. 5A and 5B are cross-section views of another example of a capacitor according to the present invention.
Figure 5B:
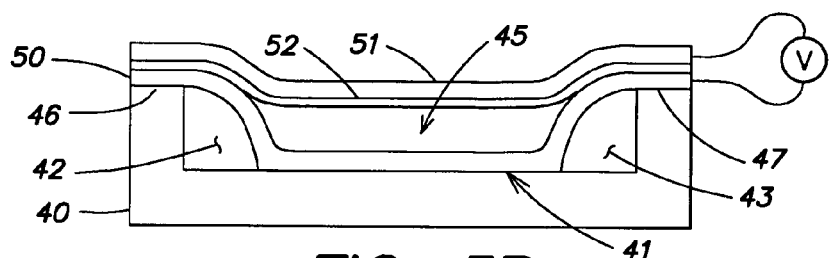

2. Other Examples of Capacitors According to the Present Invention 2.1. Structure of a First Other Example FIGS. 5A and 5B are cross-section views of a capacitor according to the present invention having a specific shape obtained according to a method described hereafter. The capacitor is formed above an insulating substrate 40 in which a substantially parallelepipedal trench 41 is formed. Spacers 42 and 43 are placed against two opposite walls of trench 41 and laid on the bottom of trench 41. The covered portion of spacers 42 and 43 has a curved shape between the upper edges of trench 41 and the trench bottom. The portion of trench 41 not taken up by spacers 42 and 43 forms a groove portion 45. The upper portions of the substrate located close to groove portion 45 (or to trench 41) form two lateral edges 46 and 47. Due to the presence of spacers 42 and 43, the depth of groove portion 45 continuously increases from the groove edges to the groove bottom.

As for the capacitor shown in FIG. 2A, a conductive layer 50 covers the inside of groove portion 45. A flexible membrane 51, formed of a conductive material, is placed above groove portion 45 and bears on the portions of conductive layer 50 covering edges 46 and 47 of the groove portion. An insulating layer 52 covering in this example the lower surface of flexible membrane 51 insulates conductive layer 50 and flexible membrane 51. Conductive layer 50 and flexible membrane 51 are connected to two terminals between which a control circuit V applies a voltage on request.

In the idle state, when control circuit V applies no voltage, membrane 51 and insulating layer 52 are substantially horizontal, as shown in FIG. 5A. When control circuit V applies a voltage, membrane 51 deforms and progressively sticks against conductive layer 50, as illustrated in FIG. 5B. By varying the voltage applied by control circuit V, it is possible to adjust the capacitance of the capacitor.

2.2. Structure of a Second Other Example

Figure 6A:
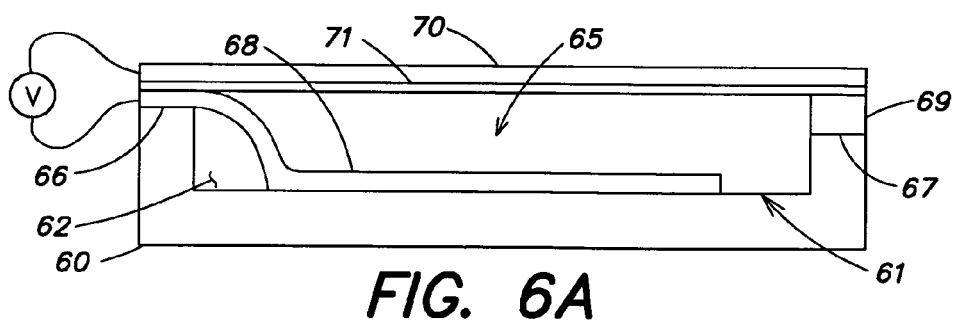
FIGS. 6A and 6B are cross-section views of another example of a capacitor according to the present invention.
Figure 6B:
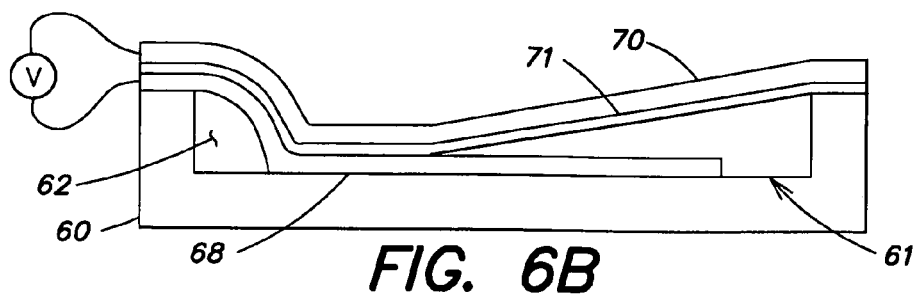

FIGS. 6A and 6B are cross-section views of another example of a capacitor according to the present invention. The capacitor is formed above an insulating substrate 60 in which is formed a trench 61 having a substantially parallelepipedal shape. A spacer 62 is placed against one of the vertical walls of trench 61. The exposed portion of spacer 62 has a curved shape like spacers 42 and 43 of the capacitor of FIGS. 5A and 5B. The portion of trench 61 not taken up by spacer 62 forms a groove portion 65. The upper portions of substrate 60 located close to groove portion 65 form two lateral edges 66 and 67. On the side of spacer 62, the depth of groove portion 65 continuously increases from edge 66 to the groove bottom. On the other side of the groove, close to edge 67, the groove depth is maximum.

According to an aspect of this capacitor example, a conductive layer 68 covers edge 66, spacer 62 and a great part of the bottom of groove portion 65. Conductive layer 68 covers neither the vertical wall located close to edge 67, nor a portion of the bottom of groove portion 65 located close to this wall.

Like the capacitors described hereabove, the capacitor of FIGS. 6A and 6B comprises a flexible membrane 70 placed above groove portion 65 by bearing on edges 66 and 67 of groove portion 65, above conductive layer 68. An insulating layer 71 placed in this example on the lower surface of flexible membrane 70 enables insulating conductive layer 68 and flexible membrane 70. Conductive layer 68 and membrane 70 are connected to two terminals between which a control circuit V applies a voltage on request.

In the idle state, when control circuit V applies no voltage, membrane 70 and insulating layer 71 are substantially horizontal, as shown in FIG. 6A. When control circuit V applies a voltage, membrane 70 deforms and progressively sticks against conductive layer 68. Flexible membrane 70 first sticks against the portion of conductive layer 68 located above spacer 62, then progressively on the portion of conductive layer 68 placed on the bottom of groove portion 65, as shown in FIG. 6B. The higher the voltage, the larger the stuck portion of the membrane.

An advantage of a capacitor such as shown in FIGS. 6A and 6B is that it is possible to more finely adjust its capacitance.

The above-described capacitors are examples of capacitors according to the present invention. Generally, a capacitor according to the present invention comprises a fixed electrode covering a portion of a cavity formed in an insulating substrate, a mobile electrode placed above the cavity substantially vertically above the fixed electrode and a dielectric layer placed between the two electrodes. The cavity may have several shapes in top view. In the above-mentioned examples, the cavity has a substantially rectangular shape, but it may be circular, oval, or of any other shape. Whatever the shape of the cavity in top view, the cavity portion covered with the fixed electrode has a groove-shaped cross-section view. The groove-shaped cavity portion is such that its depth continuously increases from the groove edges to the groove bottom.

2.3. Method for Manufacturing the Other Capacitor Examples

The capacitors described in relation with FIGS. 5A/5B and 6A/6B may be obtained according to a method comprising on the one hand the forming of a groove portion 45 or 65 and on the other hand the forming of the insulated electrodes. The method for forming a groove portion 45 or 65 comprises forming a trench in an insulating substrate, then of forming spacers against the trench walls. In the case where it is desired to have a spacer only against one of the trench walls, one of the two formed spacers may be eliminated. The spacers may be formed according to a conventional method comprising performing a conformal deposition for example of nitride, then of anisotropically etching the nitride. Another method for forming spacers comprising performing a conformal deposition of a thin insulating layer, for example, made of nitride, at the bottom, on the walls, and on the edge of trench 41 or 61, then of performing another deposition of second insulating layer, for example, made of silicon oxide, so that trench 41 or 61 is totally filled, and of finally performing a chem./mech polishing using a selective chemical etch method to etch the second insulating layer faster than the thin insulating layer. Since the insulating layer portion located in the middle of the trench etches faster than the portions located against the trench walls, spacers form against the trench walls.

Once groove portion 45 or 65 has been formed, the insulated electrodes may be formed according to a method similar to that described in relation with FIGS. 4D to 4H. In the case of the capacitor described in relation with FIGS. 6A and 6B, an additional step comprising etching certain portions of the conductive layer deposited inside of the groove portion, and on edge 67, to eliminate the portions of the conductive layer located close to the trench wall with no spacer, will be provided.

3. Structure and Method for Manufacturing a Capacitor Placed in a Groove with Multiple Inclinations When the depth of the groove portion in which a capacitor according to the present invention is formed very regularly decreases from the edges of the groove to its bottom, the following problem may occur. Conversely to the previously-discussed representations of a capacitor according to the present invention, and especially in FIGS. 2A, 2B, 3, the length of the fixed electrode placed at the bottom of the groove is much larger than the groove depth. Further, in the forming of a groove portion according to the method described hereabove in relation with FIGS. 4A to 4C, the profile of the obtained groove varies according to various parameters such as the chem./mech polishing conditions, or the geometric features of the cavity hosting the groove portion on which the capacitor is formed. Now, the more different the groove profiles, the more the capacitor features diverge. Accordingly, for a given voltage applied between the capacitor electrodes, substantially different capacitance values can be observed.

Figure 7:
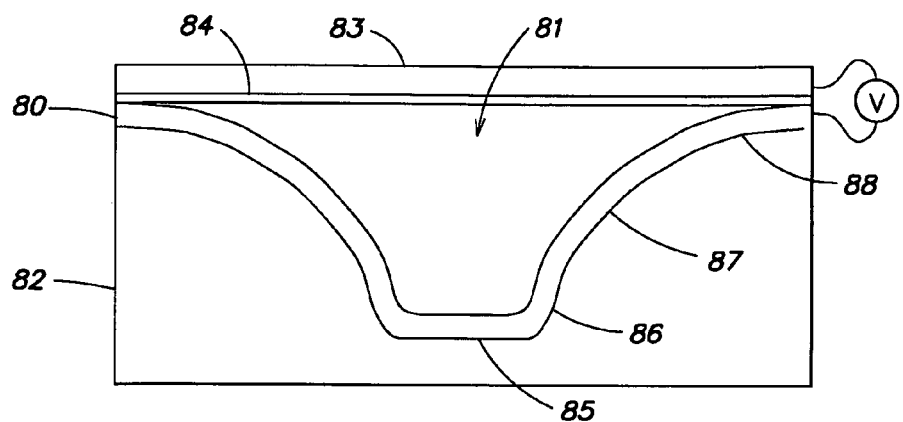
FIG. 7 is a cross-section view of a capacitor according to the present invention formed in a groove exhibiting multiple inclinations.

FIG. 7 is a cross-section view of a capacitor according to the present invention formed in a groove having a profile enabling overcoming the above-mentioned problem. The capacitor comprises a fixed electrode 80 covering the inside of a groove portion 81 formed in an insulating substrate 82, a mobile electrode 83 placed above groove portion 81, and an insulating layer 84 placed under mobile electrode 83. The capacitor is formed in a groove portion 81, having its depth increasing faster and faster from the groove edges to the groove bottom. Bottom 85 of the groove is substantially flat in this example. From the bottom to one of the edges of the groove, three portions of the upper surface of groove 86, 87, and 88 can be distinguished. Portion 86 has a strong inclination, portion 87 has a medium inclination, and portion 88 has a small inclination. Fixed electrode 80 of the capacitor has a shape similar to groove portion 81. Each side of the electrode comprises three portions having inclinations increasing from the groove edges to the groove bottom.

When the capacitor capacitance is desired to be increased by "sticking" more and more the mobile electrode to the fixed electrode, it is necessary to significantly increase the applied voltage when the fixed electrode starts a "change of slope" to stick on a more inclined portion. On the contrary, a voltage value applied between the electrodes which corresponds to an overlapping of a given number of portions of the fixed electrode may be defined, since the electrostatic force induced by this voltage does not enable the mobile electrode to reach the next portion of the fixed electrode which exhibits a greater inclination. The division of the fixed electrode into several portions of different inclination thus enables more precisely defining the facing electrode surface area for a given voltage applied between the electrodes. Accordingly, it is possible to more precisely define the capacitor capacitance corresponding to a given voltage applied between electrodes.

A capacitor comprising a multiple-inclination fixed electrode can be obtained according to the method described hereafter.

Figure 8A:
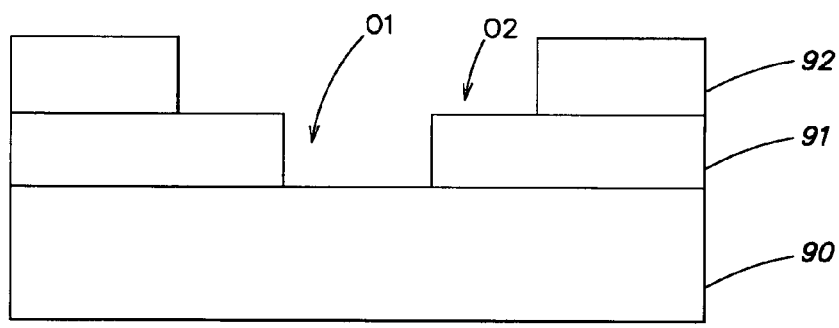
FIGS. 8A and 8B are cross-section views of structures obtained after successive steps of a method for manufacturing a groove exhibiting multiple inclinations.

In a first step, illustrated in FIG. 8A, a first insulating layer 91 is deposited on an insulating substrate 90. An opening O1 is then formed in first insulating layer 91 to expose the upper surface of substrate 90. A second insulating layer 92 is then deposited on the entire previously-obtained structure. Then, an opening O2 is formed in second insulating layer 92 above opening O1, opening O2 being larger than opening O1. Opening O2 is such that the portions of insulating layer 91 located all around opening O1 are exposed.

Figure 8B:
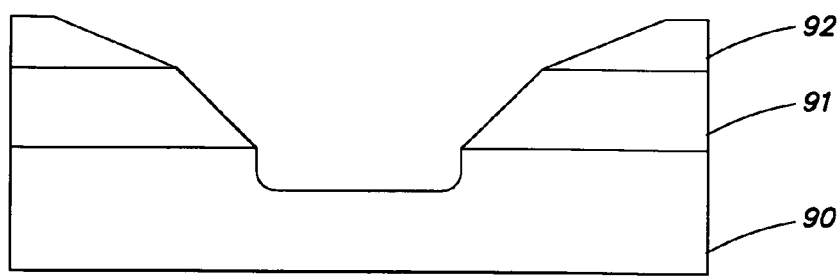

At the next step, illustrated in FIG. 8B, a chem./mech polishing of the previously-obtained structure is performed. The used etch method is such that the etch speeds are different for each of the insulating layers and for the substrate, second insulating layer 92 etching faster than first insulating layer 91, itself etching faster than substrate 90. The thickness of the second insulating layer decreases substantially and its sides, on the side of opening O2, are greatly planed. The sides of first insulating layer 91 are also planed. Further, a cavity forms in substrate 90, substantially under opening O1 of first insulating layer 91. A groove comprising portions of different inclinations is then obtained in cross-section view, the inclination of the groove portions corresponding to the sides of second insulating layer 92 being greater than the inclination of the groove portion corresponding to the sides of first insulating layer 91. Similarly, the inclination of the groove portions corresponding to the sides of first insulating layer 92 is greater than the inclination of the groove portions corresponding to the walls of the cavity formed in substrate 90.

Generally, it will be within the abilities of those skilled in the art to implement a similar method for forming grooves exhibiting a desired number of variously-inclined portions.

4. Resonator

Figure 9A:
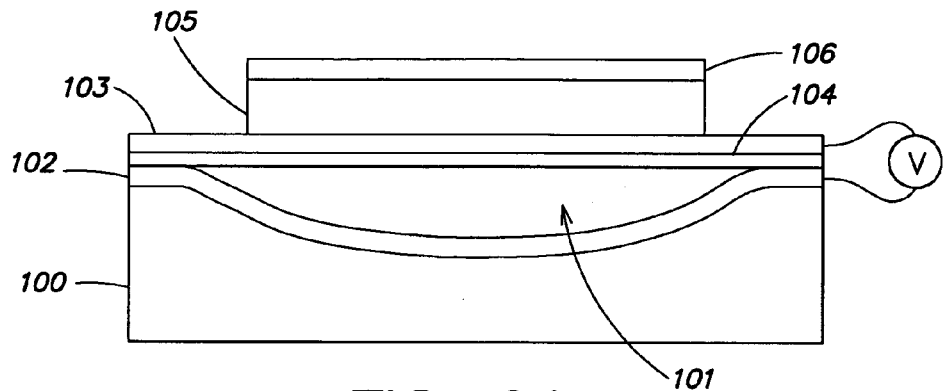
FIGS. 9A and 9B are cross-section views of a resonator comprising a capacitor according to the present invention.
Figure 9B:
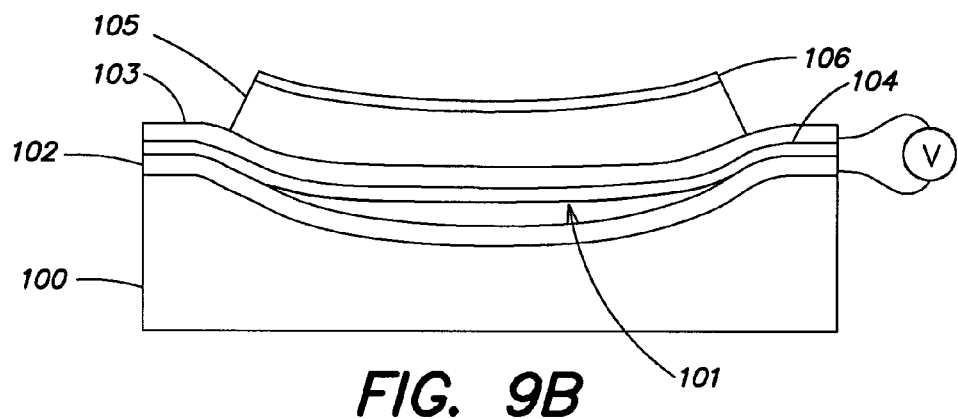

FIGS. 9A and 9B are cross-section views of a resonator comprising a capacitor according to the present invention. The capacitor of the resonator is identical to that shown in FIG. 2A. The capacitor is formed in an insulating substrate 100 in which a groove portion 101 is formed. A conductive layer 102 covers the inside of groove portion 101 as well as its edges. A flexible membrane 103 is placed above groove portion 101 by bearing on its edges. Membrane 103 and conductive layer 102 are insulated by an insulating layer 104 covering the lower surface of membrane 103. As previously, membrane 103 and conductive layer 102 are connected to two terminals between which a control circuit V applies a voltage on request.

Flexible membrane 103 forms in this example the lower electrode of the resonator. A portion of a piezoelectric material 105 is laid on membrane 103 above groove portion 101. Piezoelectric portion 105 is covered with a conductive layer 106 forming the upper electrode of the resonator.

The operation of such a resonator is described in U.S. patent application Ser. No. 10/794,527, entitled Method For Forming A Tunable Piezoelectric Microresonator, which is incorporated herein by reference. A change in the capacitance of the capacitor on which the resonator is placed enables adjusting its resonant frequency. Further, as shown in FIG. 9B, when membrane 103 is deformed to adjust the capacitor capacitance, piezoelectric portion 105 slightly deforms on the edges. This local deformation of the resonator edges enables suppressing unwanted reflections, or spurious resonances, which adversely affect the resonator quality.

Figure 10:
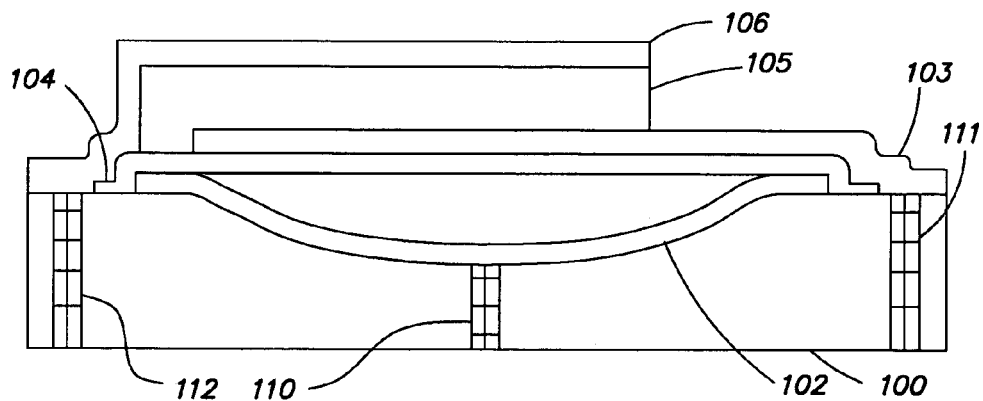
FIG. 10 is a more detailed cross-section view of the resonator shown in FIGS. 9A and 9B.

FIG. 10 is a cross-section view of the resonator shown in FIGS. 9A and 9B in which the connections between the capacitor electrodes and other elements of the integrated circuit in which the resonator is placed are shown. A resonator such as described hereabove is in this example placed above the integrated circuit interconnect network. Conductive layer 102 may easily be connected to the underlying network via a conductive via 110. To connect the lower resonator electrode, that is, flexible membrane 103, insulating layer 104 may be prolonged beyond conductive layer 102 to reach insulating substrate 100 and membrane 103 may be prolonged above the prolonging of insulating layer 104 to reach a portion of insulating substrate 100 in which a conductive via 101 reaching the interconnect network has been placed. To connect the upper electrode of the resonator, that is, conductive layer 106, it may be provided to prolong piezoelectric portion 105 on one side of flexible membrane 103 to reach insulating layer 104, which will also be prolonged beyond conductive layer 102 to reach insulating substrate 100, after which layer 106 will be prolonged along one of the sides of piezoelectric portion 105 to reach insulating layer 104 and a substrate portion 100 in which a conductive via 112 will have been placed.

Other modes of connection of the various electrodes may be devised by those skilled in the art.

5. Microswitch

Figure 11A:
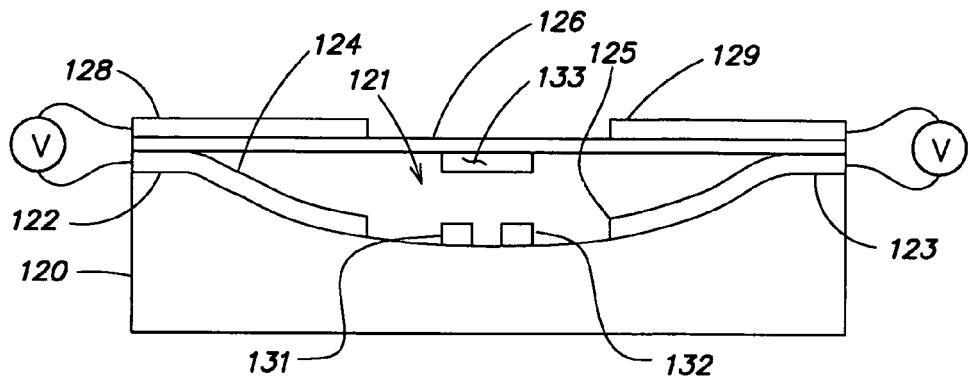
FIGS. 11A and 11B are cross-section views of a microswitch comprising a capacitor according to the present invention.
Figure 11B:
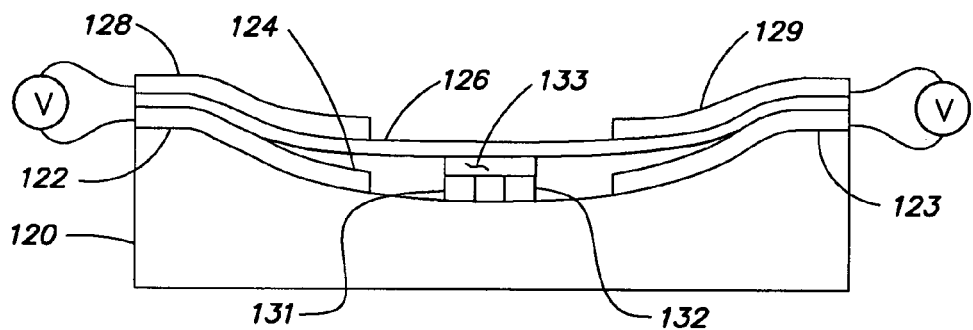
Figure 12:
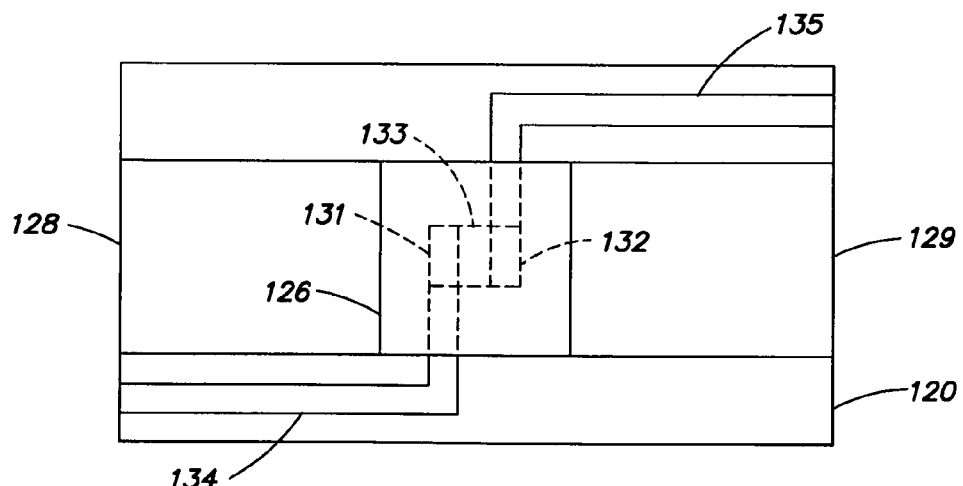
FIG. 12 is a top view of the microswitch shown in FIGS. 11A and 11B.

FIGS. 11A and 11B are cross-section views of a microswitch comprising a capacitor according to the present invention. FIG. 12 is a top view of the microswitch shown in FIGS. 11A and 11B. The microswitch is formed in an insulating substrate 120 in which a groove portion 121 is formed. The upper portions of insulating substrate 120 located close to groove portion 121 form two lateral edges 122 and 123. Two conductive layer portions 124 and 125 each cover one side of groove portion 121. Portion 124 substantially extends from the bottom of groove 121 to edge 122 that it covers. Similarly, portion 125 extends substantially from the bottom of groove 121 to edge 123 that it covers. A bridge-shaped insulating layer 126 is placed above groove 121 and bears against edges 122 and 123, more specifically against conductive layer portions 124 and 125 covering edges 122 and 123. Two conductive layer portions 128 and 129 are placed on insulating layer 126 substantially above conductive layer portions 124 and 125. Two conductive pads 131 and 132 are placed in the bottom of groove 121 between the two conductive layer portions 124 and 125. A conductive pad 133 is inserted in insulating layer 126 on its lower surface side. Pad 133 is placed above conductive pads 131 and 132. Conductive pads 131 and 132 are respectively connected to two conductive lines 134 and 135 placed in groove portion 121 and visible in FIG. 12 on either side of bridge-shaped insulating layer 126. Portions 124 and 125 form the lower capacitor electrode. Conductive portions 128 and 129 form the upper electrode of this capacitor. The lower and upper electrodes are connected to two terminals between which a voltage may be applied.

In the idle state, when no voltage is applied between the capacitor electrodes, insulating layer 126 and the upper electrode are substantially horizontal as shown in FIG. 11A. When a voltage is applied between the lower and upper capacitor electrodes, the upper electrode deforms until pad 133 is in contact with pads 131 and 132, as shown in FIG. 11B. Conductive lines 134 and 135 connected to pads 131 and 132 are then put in contact.

Other structures of microswitches comprising a variable capacitor according to the present invention may be devised. It may among others be provided to place several conductive pads under the conductive layer opposite to several pairs of conductive pads placed in the bottom of groove 121 and each connected to two conductive lines.

Of course, the present invention is likely to have various alterations, modifications, and improvements which will readily occur to those skilled in the art. In particular, a capacitor according to the present invention may be used in other components. Further, those skilled in the art may devise other methods for manufacturing a capacitor according to the present invention.

Further, several types of components comprising a capacitor according to the present invention may advantageously be formed on the same integrated circuit. In the case, for example, of a circuit comprising variable capacitors and resonators "assembled" on variable capacitors, all the capacitors may be formed simultaneously by implementing the same series of manufacturing steps.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for forming a variable capacitor comprising:
    forming a cavity in an insulating substrate, a cavity portion substantially having the shape of a groove portion, the upper parts of the substrate located close to said groove portion forming two lateral edges, the depth of the groove portion increasing continuously from one of the edges to the bottom of the groove portion;
    covering the inside of the groove portion, at least to reach one of the edges and possibly covering one or two edges with a first conductive layer;
    filling the cavity with a sacrificial portion;
    covering the sacrificial portion, the upper substrate portions and possibly the portions of the first conductive layer placed above the lateral edges with an insulating layer and with a second conductive layer;
    etching the insulating layer and the second conductive layer to keep a bridge-shaped portion running over the groove portion and bearing against the lateral edges; and
    removing the sacrificial portion.

2. The method of claim 1, wherein forming a cavity in an insulating substrate comprises:
    forming insulating pads on a support layer;
    covering the support layer and the insulating pads with an insulating layer; and
    performing a chem./mech polishing of the insulating layer to expose the insulating pads, the etch method of the polishing being such that it etches more the insulating layer than the insulating pads, the insulating pads forming said lateral edges.

3. The method of claim 1, further comprising, prior to the filling of the cavity with a sacrificial portion, forming insulating portions on the cavity edge, the cavity filling then comprising depositing a sacrificial layer over the entire structure and then performing a chem./mech polishing to expose the insulating portions.

4. The method of claim 1, wherein the step of forming a cavity in a substrate comprises:
    providing, on an insulating substrate, a stacking of different insulating layers, an opening being formed in each of the layers, the openings being superposed and larger and larger as they are further away from the substrate, each opening being placed to completely expose the underlying opening; and
    performing a chem./mech polishing of the previously-obtained structure by using an etch method such that the etch speeds of the different insulating layers are different and increase from the substrate to the top of the stacking.

* * * * *

UNITED STATES PATENT AND TRADEMARK OFFICE
CERTIFICATE OF CORRECTION

PATENT NO.          : 7,200,908 B2						Page 1 of 1
APPLICATION NO. : 11/442420
DATED               : April 10, 2007
INVENTOR(S)         : Fabrice Cassett et al.

It is certified that error appears in the above-identified patent and that said Letters Patent is hereby corrected as shown below:

On Title Page, item 57, in the Abstract, line 1 should read:
--A method of making a variable capacitor by forming a groove portion--

Col. 5, line 50 should read:
--invention is that it is possible to adjust its capacitance with--

Col. 10, line 2, should read:
--under opening O1 of first insulating layer 91. A groove--

Signed and Sealed this

Twelfth Day of June, 2007

JON W. DUDAS
*Director of the United States Patent and Trademark Office*